(12) United States Patent
Patel et al.

(10) Patent No.: US 6,535,335 B2
(45) Date of Patent: Mar. 18, 2003

(54) OPTICAL POLARIZATION ENCODER

(75) Inventors: Jay S Patel, Newtown, PA (US); Zhizhong Zhuang, Yardley, PA (US)

(73) Assignee: Optellios, Inc., Ewing, NJ (US)

( * ) Notice: Subject to any disclaimer, the term of this patent is extended or adjusted under 35 U.S.C. 154(b) by 0 days.

(21) Appl. No.: 09/974,826

(22) Filed: Oct. 12, 2001

(65) Prior Publication Data

US 2002/0060826 A1 May 23, 2002

Related U.S. Application Data

(60) Provisional application No. 60/252,557, filed on Nov. 22, 2000.

(51) Int. Cl.[7] ................................................. G02B 5/30
(52) U.S. Cl. ........................ 359/497; 359/495; 359/156; 359/124
(58) Field of Search ........................ 359/122, 156, 359/124, 494–496, 497

(56) References Cited

U.S. PATENT DOCUMENTS

| | | | |
|---|---|---|---|
| 5,414,541 A | 5/1995 | Patel et al. | 359/39 |
| 5,694,233 A | 12/1997 | Wu et al. | 359/117 |
| 5,946,116 A | 8/1999 | Wu et al. | 359/117 |
| 5,978,116 A | 11/1999 | Wu et al. | 359/124 |
| 5,978,125 A | 11/1999 | Yao | 359/256 |
| 6,163,393 A | 12/2000 | Wu et al. | 359/127 |
| 6,212,313 B1 | 4/2001 | Li | 385/24 |
| 6,215,923 B1 | 4/2001 | Li | 385/24 |
| 6,243,200 B1 * | 6/2001 | Zhou et al. | 359/497 |
| 6,333,816 B1 * | 12/2001 | Chen et al. | 359/497 |

OTHER PUBLICATIONS

S. E. Harris, E. O. Ammann and I.C. Chang, "Optical Network Synthesis using Birefringent Crystals. I. Synthesis of Lossless Networks of Equal–Length Crystals," Journal of the Optical Society of America (vol. 54, No. 10, pp.1267–1279,Oct. 1964).

E. O. Ammann and I. C. Chang, "Optical Network Synthesis using Birefringent Crystals. II. Synthesis of Networks Containing One Crystal, Optical Compensator, and Polarizer per Stage," Journal of the Optical Society of America (vol. 55, No. 7, pp. 835–841, Jul. 1965).

* cited by examiner

*Primary Examiner*—Kinfe-Michael Negash
(74) *Attorney, Agent, or Firm*—Duane Morris, LLP

(57) ABSTRACT

An optical polarization encoding device has been invented which allows wavelength dependent processing of polychromatic optical signals without prior separation into narrow wavelength bands. The invention comprises a stack of variable and fixed birefringent elements which introduces, on passage through the stack, a wavelength dependent polarization onto a polychromatic optical signal of arbitrary polarization. Desired polarizations are achieved simultaneously at all wavelengths contained within the incoming signal by independently varying the birefringence and/or crystallographic orientation of each element within the stack. The encoded signal may be subsequently be processed, e.g. rerouted or attenuated, as a function of wavelength using polarization dependent devices. The encoding stack is rendered polarization insensitive by dividing the incoming optical signal, with a polarization beam splitter, into two beams of orthogonal polarization prior to passage through the stack.

25 Claims, 8 Drawing Sheets

OPTICAL POLARIZATION ENCODER

This application claims priority from U.S. Provisional Patent Application Serial No. 60/252,557, herein incorporated by reference.

BACKGROUND OF THE INVENTION

The present invention relates to devices utilized in optical transmission systems. In particular, it relates to polarization encoding of optical signals as a function of wavelength.

DESCRIPTION OF RELATED ART

With the development of technologies such as wavelength division multiplexed (WDM) optical communication systems, a need has been created for inexpensive, efficient means to effect wavelength dependent processing of optical signals, for example so that individual channels may be manipulated. Examples of such processing include wavelength selectable optical switching, useful in routing individual wavelength channels for WDM systems, and wavelength dependent power attenuation, which might be used for gain equalization in a WDM system.

One known approach to wavelength dependent processing of optical signals is to first separate, or demultiplex, the individual channels and then to process each channel separately. The processed channels may then be multiplexed back into a single fiber, separately distributed, or otherwise manipulated.

A disadvantage to demultiplexer and multiplexer based devices is that insertion losses are generally high. Also, devices based on demultiplexer geometry tend to be bulky and expensive. Therefore a new approach is needed in which no multiplexer or demultiplexer operation is needed.

The inventors have recognized uses for a device that can alter polarization of an optical signal, and in particular that can alter polarization of the optical signal differently for different wavelength components of the signal. Such a device could be used in applications including distortion correction, optical power level adjustment and tunable optical switches that are capable of avoiding multiplexing/demultiplexing steps.

Birefringent materials are known to be able to impose wavelength dependent polarization characteristics.

Single waveplates, however have limited application. A fixed stacked group of birefringent elements is able to allow manipulation of a particular group of channels, but does not allow arbitrary alteration of the output as for example discussed in Harris, Amman and Chang, "Optical Network Synthesis using Birefringent Crystals. I. Synthesis of Lossless Networks of Equal-Length Crystals," and Amman and Chang, "Optical Network Synthesis using Birefringent Crystals. II. Synthesis of Networks Containing One Crystal, Optical Compensator, and Polarizer per Stage."

Such a fixed stack of birefringent elements have been used in conjunction with a digital polarization converter to allow some control over the transfer function of the device. In particular, stacked birefringent elements have been tried as a solution to all-optical switching based on polarization as shown, for example, in U.S. Pat. No. 5,694,233 to Wu, et al. ("the '233 patent").

The inventors have therefore identified a need for a device to selectively and controllably change a polarization state of selected ones of a plurality of channels, thereby allowing various further processing of a an optical signal, among other useful results.

SUMMARY OF THE INVENTION

An optical polarization encoding device has been invented which allows wavelength dependent processing of polychromatic optical signals without prior separation into narrow wavelength bands.

One embodiment of the invention includes a polarization independent polarization encoder including a first birefringent component configured and arranged to accept an input beam of light having a plurality of channels included therein and to divide the input beam of light into a first intermediate beam and a second intermediate beam, the first and second intermediate beams having respectively orthogonal polarizations, a second birefringent component configured and arranged to controllably impart a respective wavelength dependent polarization to each of selected ones of the channels in each of the intermediate beams, and a third birefringent component configured and arranged to combine the first and second intermediate beams into an output beam having the plurality of channelsat least one wavelength channel therein, each of the selected ones of the channels having a respective wavelength dependent polarization.

Another embodiment of the present invention includes a polarization encoder including a birefringent component configured and arranged to accept an input beam of light having a plurality of channels therein and to controllably impart a respective wavelength dependent polarization to each of selected ones of the channels, said birefringent component comprising a plurality of controllable variable birefringent elements.

Another aspect of the present invention includes a method of polarization encoding of an input beam of light having a plurality of channels included therein, including receiving an input beam of light, controllably imparting a polarization state to selected ones of the channels, and transmitting an output beam of light containing the polarized selected ones of the channels.

Yet another aspect of the present invention includes an optical transmission system including an input optical waveguide configured to accept an input optical signal having a plurality of channels therein, a polarization encoder in optical communication with the optical waveguide, the polarization encoder including a birefringent component configured and arranged to accept an input beam of light having a plurality of channels therein and to controllably impart a respective wavelength dependent polarization to each of selected ones of the channels, said birefringent component comprising a plurality of controllable variable birefringent elements and an output optical waveguide configured to accept an output optical signal from the polarization encoder.

DETAILED DESCRIPTION OF EMBODIMENTS OF THE INVENTION

Figure 1:
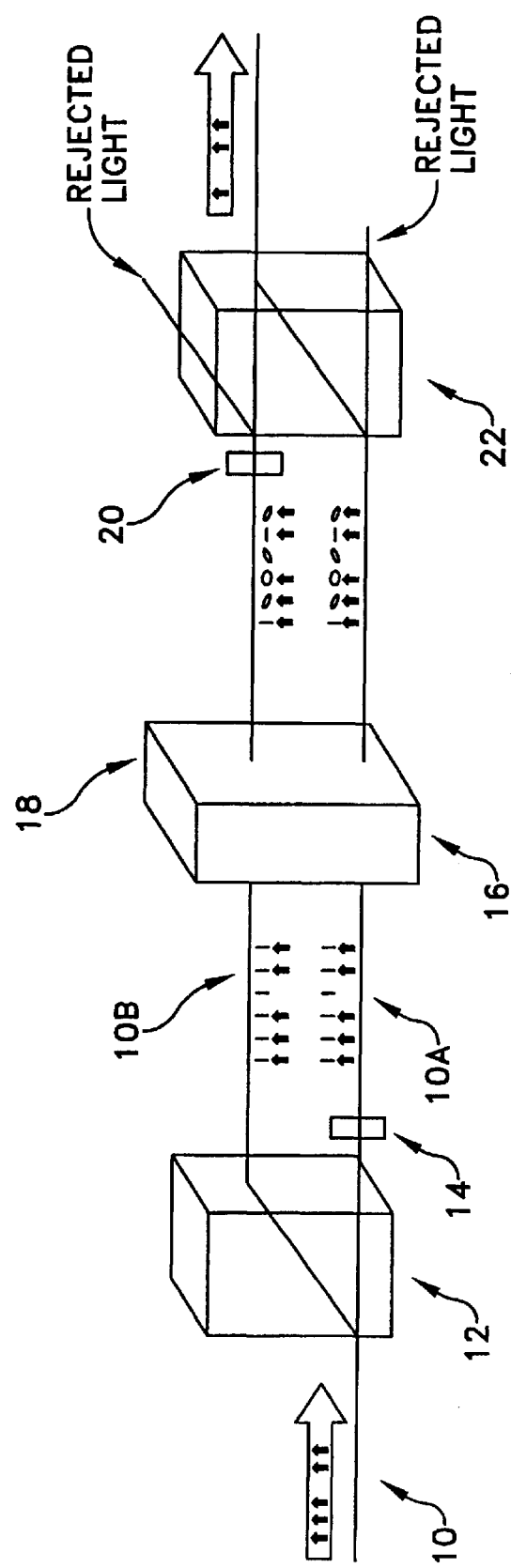
FIG. 1 is a schematic illustration of an embodiment of the present invention.

FIG. 1 is a schematic representation of an embodiment of an optical polarization encoder according to the present invention. In operation, an incoming polychromatic optical signal of arbitrary polarization 10, comprising a plurality of wavelength channels, is passed through a polarization splitter 12, converting it into two intermediate beams 10A,10B having known linear orthogonal polarizations. Subsequent polarization dependent processing before the two beams are recombined then results in Stokes parameters of equal magnitude and opposite sign for each particular wavelength component contributed from each beam. As a result of this preliminary orthogonalization, the entire polarization encoder may be rendered polarization insensitive. The polarization splitter 12 may be, for example, a polarization beam splitter, a beam displacer, a Wollaston prism, or any other component capable of separating the beam into a pair of orthogonal intermediate beams.

The intermediate beams 10A and 10B are then both passed through a polarization encoding component 16. The polarization encoding component includes a plurality of birefringent plate elements 18 arranged optically in series. Throughout the specification, the series arranged elements 18 may be referred to as "a stack" of elements, though adjacent elements may be separated by other optical elements or air gaps, for example. Each of the birefringent elements 18 may have a fixed or variable value of birefringence, and may be rotatable about the optical axis. The several elements may be substantially identical, or may be of differing thicknesses or be made from differing materials. Some possible examples of materials which may be used in variable birefrigence elements are nematic liquid crystals, twisted nematic liquid crystals, and liquid crystals which utilize ferroelectric, electroclinic or flexoelectric effects. Solid state electro-optic devices with variable polarization properties may also be used, such as those based on optically clear PLZT (lead lanthanum zirconate titanate). Some possible examples of materials which may be used in fixed birefringent elements are appropriately cut calcite crystals, liquid crystals, and birefringent fibers such as polarization maintaining fibers.

Stack elements may be arranged in any order. The crystallographic orientation of each element may be rotated independently and fixed at an arbitrary angle with respect to the fast or slow axis of the birefringent material within the element. In general, the polarization state for any and all wavelengths passing through the stack can be controllably altered. While the transfer function for each wavelength is generally coupled to transfer functions for each other wavelength, appropriate adjustments to the overall transfer function can be used to allow control over the polarization of any individual wavelength range. So while control over a given channel is not strictly independent of control over the other channels, each channel may still be individually controlled.

Due to the structure of the polarization encoder, it may be used to provide an arbitrary polarization, in contrast to the simple binary switching mechanisms shown in the prior art. That is, more than two states are available using the present invention. Moreover, the device may be continuously tuned rather than only discretely tuned.

Design of an appropriate configuration may be achieved using an optimization process in which the birefringence and/or orientation of each stack element may be varied independently until the desired polarization state is attained for all wavelengths. There are several different geometries which can be used to achieve wavelength encoding. One approach is to hold the relative orientation of all the elements fixed and selectively tune the birefringence value of the variable stack elements. It is also possible to fix the birefringence values of all the elements but change the relative orientation with respect to each other.

For most applications, sufficient flexibility is achieved if all of the fixed elements are held in a fixed orientation, but the optical orientation of the variable elements, fixed at some birefringence value such as half wave, are allowed to be arbitrarily rotated. Such devices for example, can be made by using electro-optic elements in which the optical axis of a birefringent element can be rotated with an externally applied field. The variable elements in this case, for example, can be made using the electroclinic effect in liquid crystals. It is also possible to use twisted nematic liquid crystal devices as the variable elements, which in essence change both the effective birefringence and at the same time effectively rotates the plane of polarization. A greater degree of flexibility is achieved by allowing complete freedom of both the birefringence value and the orientation of the element, at the cost of making the device more complex.

The two intermediate beams 10A and 10B are then recombined by passage through a second polarization splitter 22. The polarization splitter 22 may be a polarization beam splitter, a beam displacer, a Wollaston prism, or another similar device.

Figure 6:
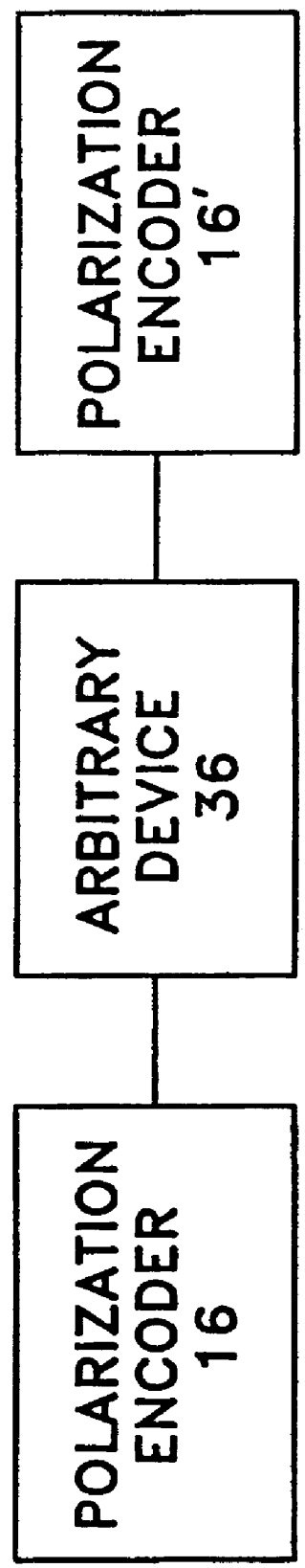
FIG. 6 is a schematic illustration of a cascaded pair of encoders according to an embodiment of the invention.

More than one polarization encoder 16 may be placed in series, or cascaded, in order to provide additional versatility, including the ability to handle switching of a greater number of channels. Likewise, as shown in FIG. 6, a polarization encoder 16 may provide an encoded output to an arbitrary device 36 which in turn is in optical communication with a second polarization encoder 16'. The second encoder 16' may be identical to the first polarization encoder 16 or may have a different configuration or different transfer function. The device 26 may be, for example, an attenuator, an amplifier, a switch or any other optical device. As will be apparent, any such combination of encoders 16 and devices 26 is contemplated within the scope of the present invention. Likewise, such cascaded devices may be iterated an arbitrary number of times such that N encoders 16 cascaded with a number of devices 36 form a complete system. If the pattern of encoder-device-encoder is followed, then the overall device will comprise N encoders and N-1 devices, where each device 36 may be arbitrarily similar to or different from each other device 36. Such a compound structure is referred to herein as an N encoder cascaded system.

A polarization dependent portion of each incoming beam may be diverted from the initial optical path on passage through the second polarization splitter. By controlling the polarization at each wavelength with the polarization encoder 16, the proportion of each beam which is diverted is controllable. If only one portion of the beam is collected, the invention may function as a wavelength dependent optical attenuator. One embodiment of the polarization splitter is a calcite beam displacer, which allows a compact device geometry. A calcite beam displacer is generally easy to fabricate and align, because of simple stacking of the crystals.

Figure 2:
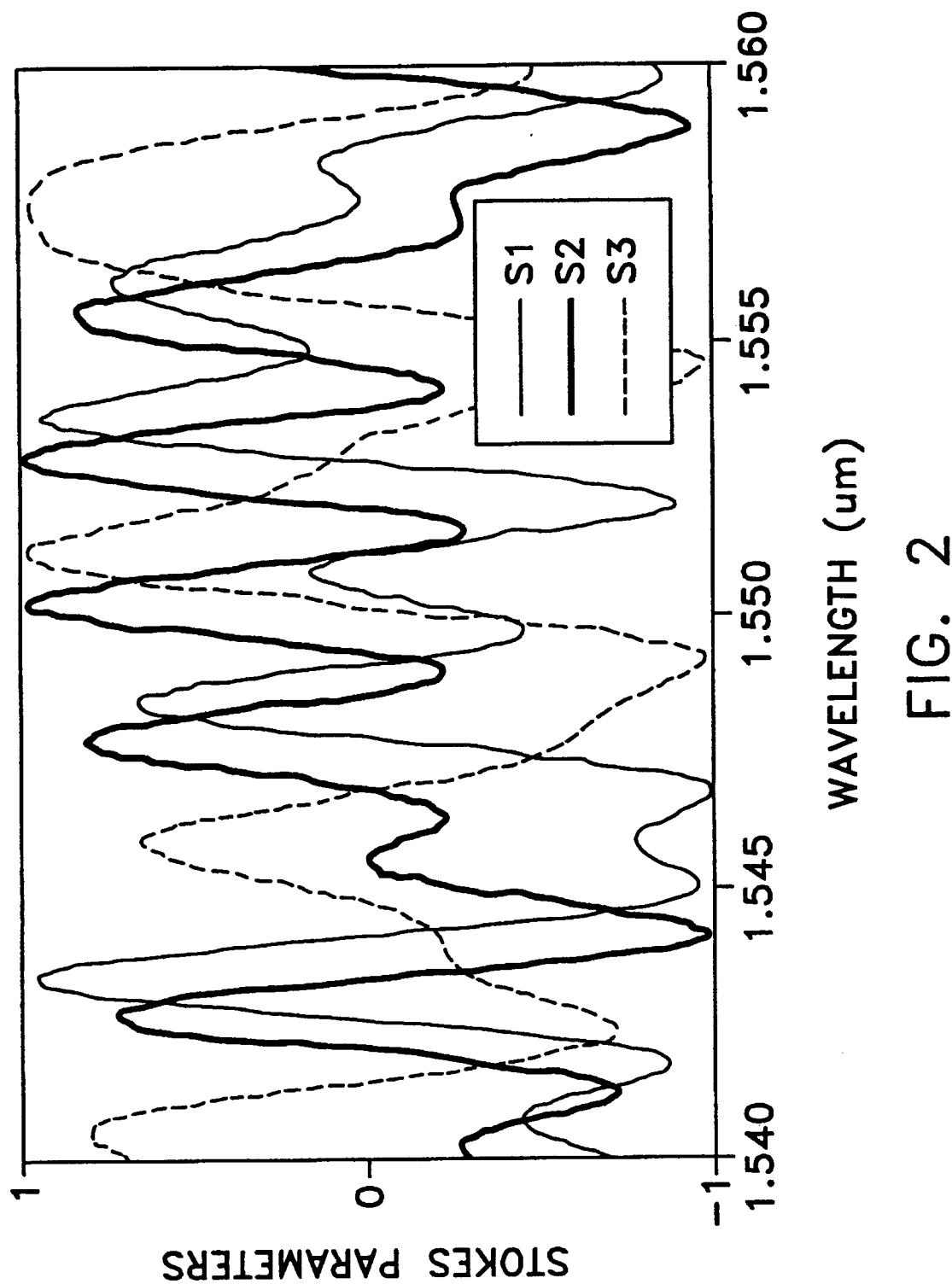
FIG. 2 is a graph of Stokes parameters vs. wavelength generated with a computer simulation for one possible stack configuration.

The results of a computer simulation for one possible stack configuration are shown in FIG. 2, with Stokes parameters represented as a function of wavelength. The simulated stack consisted of 11 elements, with five being fixed. The birefringence value was chosen to be the same for all elements at 0.2. Fixed and variable elements were singly alternated (fixed-variable-fixed-variable . . . ) with all fixed elements oriented parallel to each other so that the direction of signal propagation corresponded to the birefringent material's optical axis corresponded to the incident polarization direction. All variable elements were oriented with the element's optical axis at 45 degree with respect to that of the fixed elements. The thicknesses in microns of the 11 layers were as follows: 8.75, 250, 11.84, 450, 4.78, 810, 7.09, 1458, 9.57, 2624, 5.22. The simulation was carried out by calculating the propagation of polarized light through the series of birefringent elements by using Jones matrix algebra.

Figure 3:
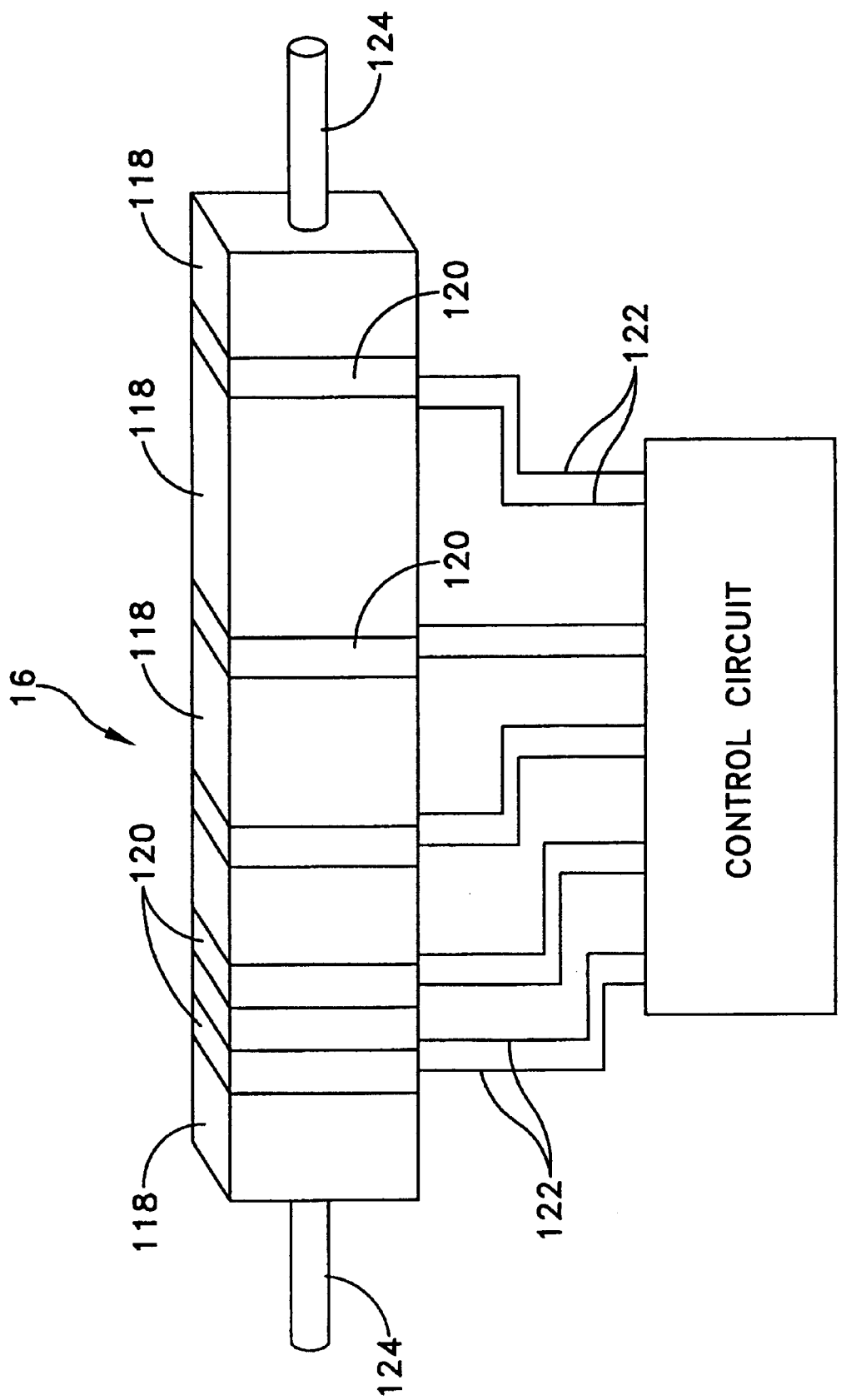
FIG. 3 is a schematic illustration of an embodiment of the invention.

Schematic illustrations of preferred embodiments of the invention are shown in FIG. 3 (schematically showing the control circuit) and FIGS. 4a–d. In these figures the beam displacing elements can be elements such as calcite crystals, with appropriately cut calcite crystals acting as fixed birefringent elements 118 and the variable elements 120 being liquid crystals, which can be produced in simple and compact geometry with multiple electrodes 122, if necessary. Input and output fiber collimators 124 can be provided as shown. FIG. 4 illustrates an encoder 16 similar to that of FIG. 3, but illustrating that the fixed elements may be of arbitrary thickness.

Figure 4A:
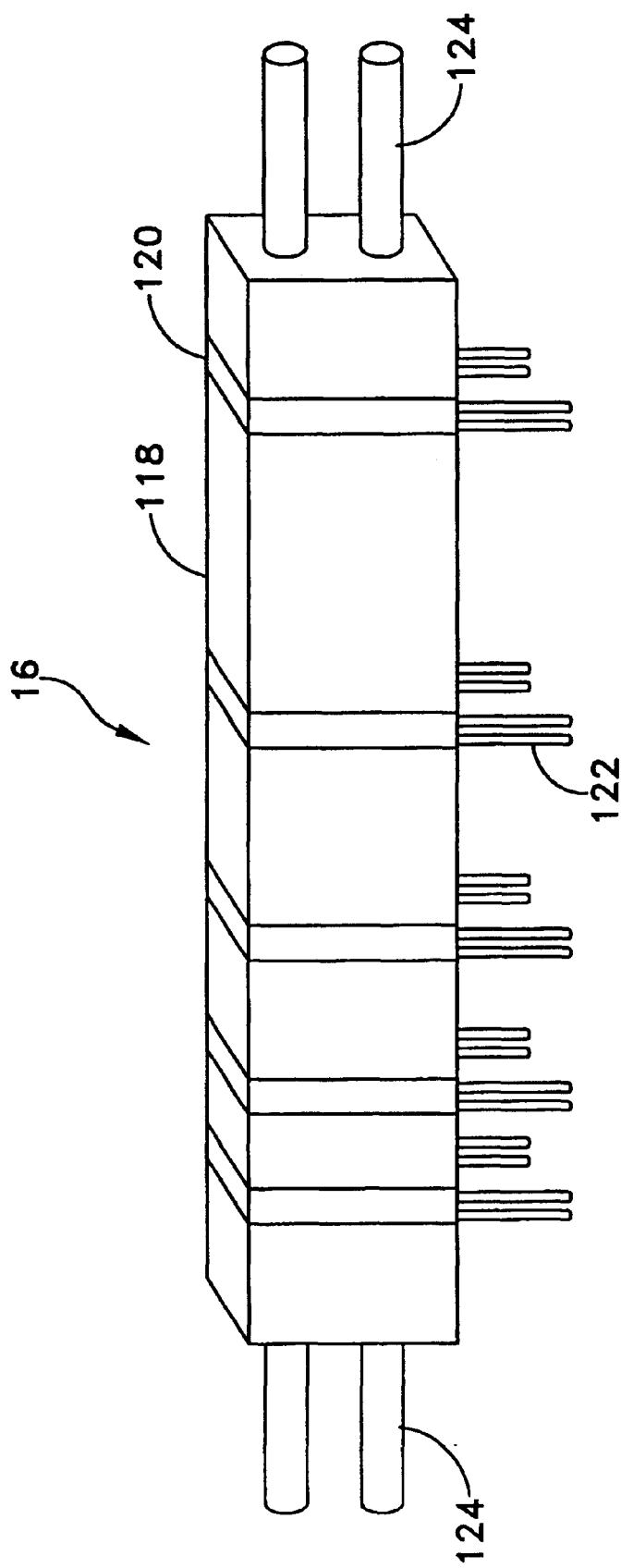
FIGS. 4a–4d are schematic illustration of various embodiments of the invention.
Figure 4B:
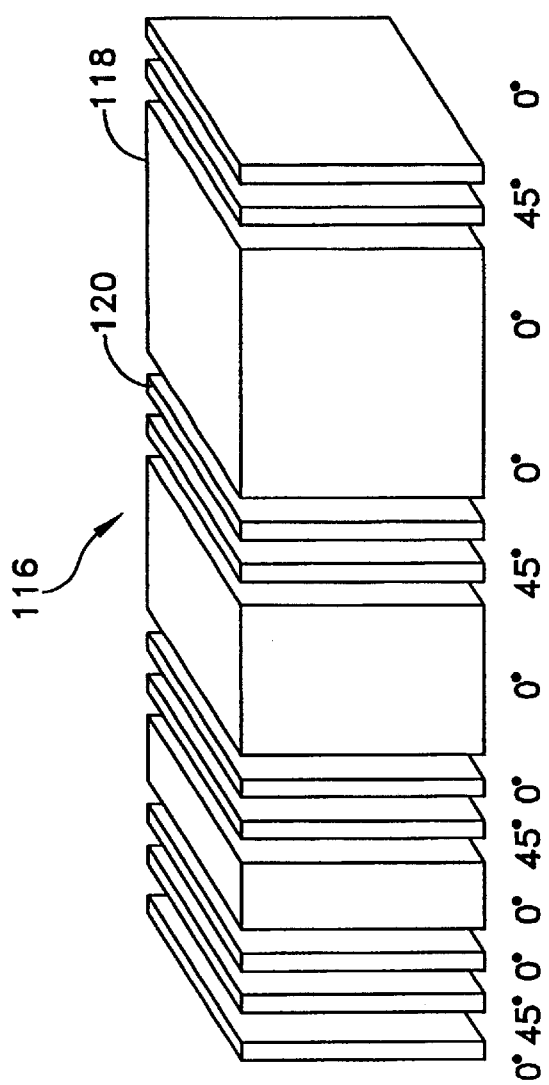
Figure 4C:
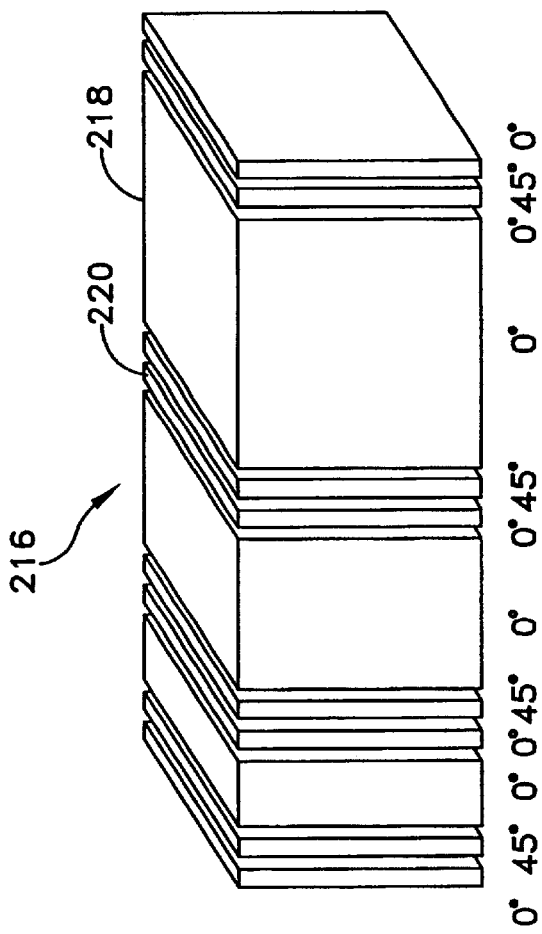
Figure 4D:
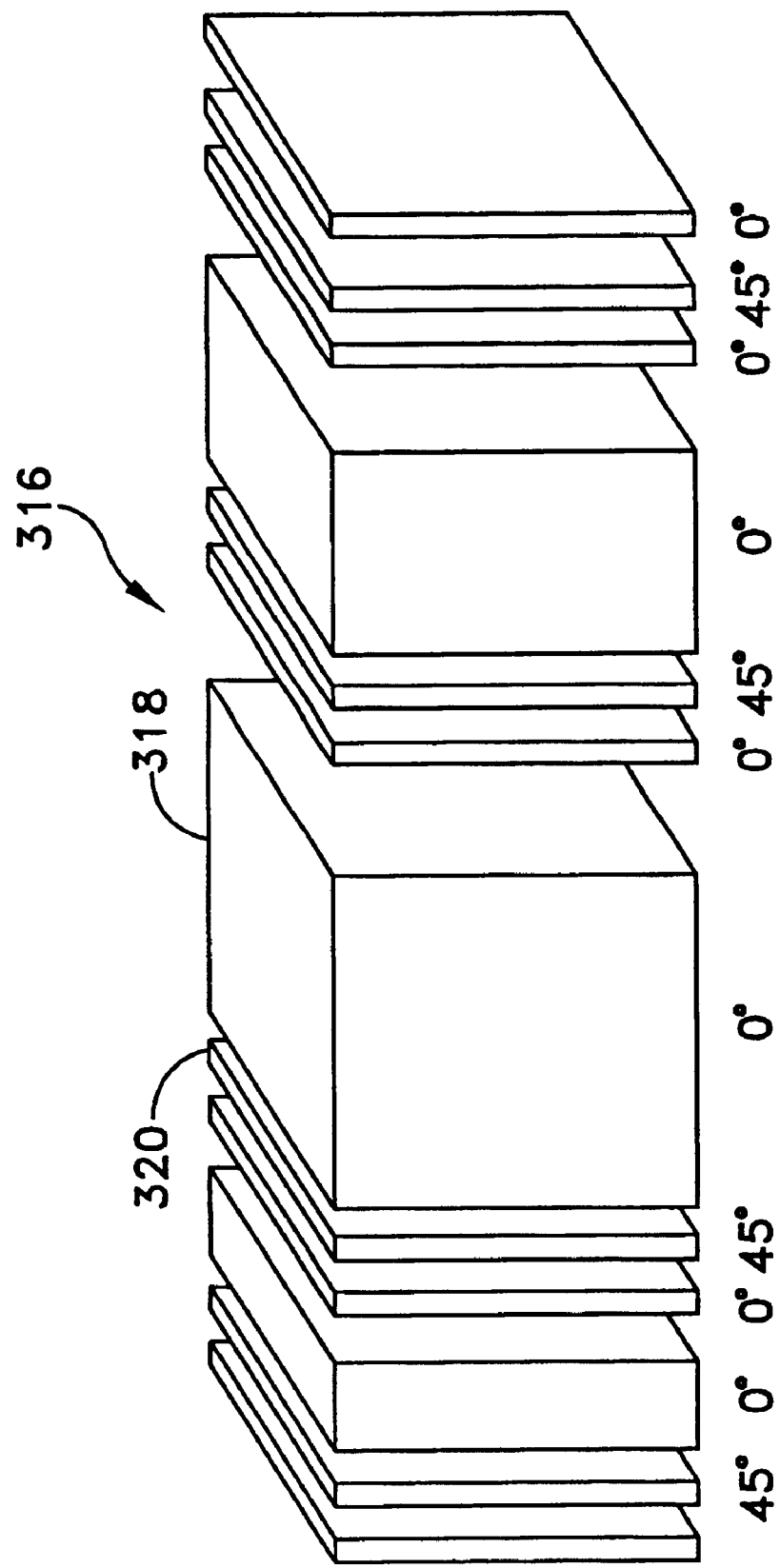

FIGS. 4b–4d illustrate the modularity and versatility of various embodiments of the polarization encoder according to the present invention. FIG. 4b illustrates an encoder 116 comprising a stack of fixed birefringent elements 118 and variable birefringent elements 120. Likewise, FIG. 4b illustrates an encoder 216 comprising a stack of fixed birefringent elements 218 and variable birefringent elements 220. Finally, FIG. 4c illustrates an encoder 316 comprising a stack of fixed birefringent elements 318 and variable birefringent elements 320. The polarization encoder stacks 116, 216 shown in FIGS. 4b and 4c have similar structures, differing in the relative positions of the variable polarizers 120, 220 which are generally reversed in order from an input side to an output side of the encoder. Likewise, the encoder 316 of FIG. 4d is similar to the encoder 216 of FIG. 4c, with the fixed birefringent elements 318 re-ordered relative to the fixed birefringent elements 218 of the encoder 216. In each figure, an axis is indicated (e.g. 0°, 45°). These axes are by way of example only and the device is not limited to the exact configurations shown.

It is possible to further reduce the thickness of the device by eliminating the glass plates commonly used for making a tunable liquid crystal element. This is possible by using the neighboring fixed birefringent elements as the container walls for the liquid crystal materials, by depositing a film of appropriate transparent electrode such as indium tin oxide on the surface of calcite crystals comprising the fixed elements, and coating the surface with the appropriate alignment coatings and rubbing.

In the above process, the birefringent elements take the place of glass in a typical liquid crystal manufacturing process. In the typical process, liquid crystal material is sandwiched between two glass plates which are held at a uniform spacing. The glass plates help to define the orientation of the liquid crystal molecules. To facilitate the orientation of the molecules, the inner surfaces of the glasses are coated with a special thin film which is rubbed using cloth along a fixed direction. When these two rubbed glasses are used to make a liquid crystal cell, the liquid crystal molecules at the glass surface are oriented along the rubbing direction. If the glasses are arranged so that the rubbing directions are anti-parallel or parallel to each other, the liquid crystal molecules will become aligned parallel to each other and form a homogeneous linear birefringent waveplate. Generally, the slow axis of the crystal is defined by the rubbing direction.

Furthermore, a means of monitoring the encoder's performance can be incorporated according to one aspect of the invention. As the signal is split into two parts, one transmitting the signal, the other generally unused, the unused portion can be used to monitor the signal. Since the signals are related as conjugates, measurements of one portion will provide a good description of the other.

Figure 5:
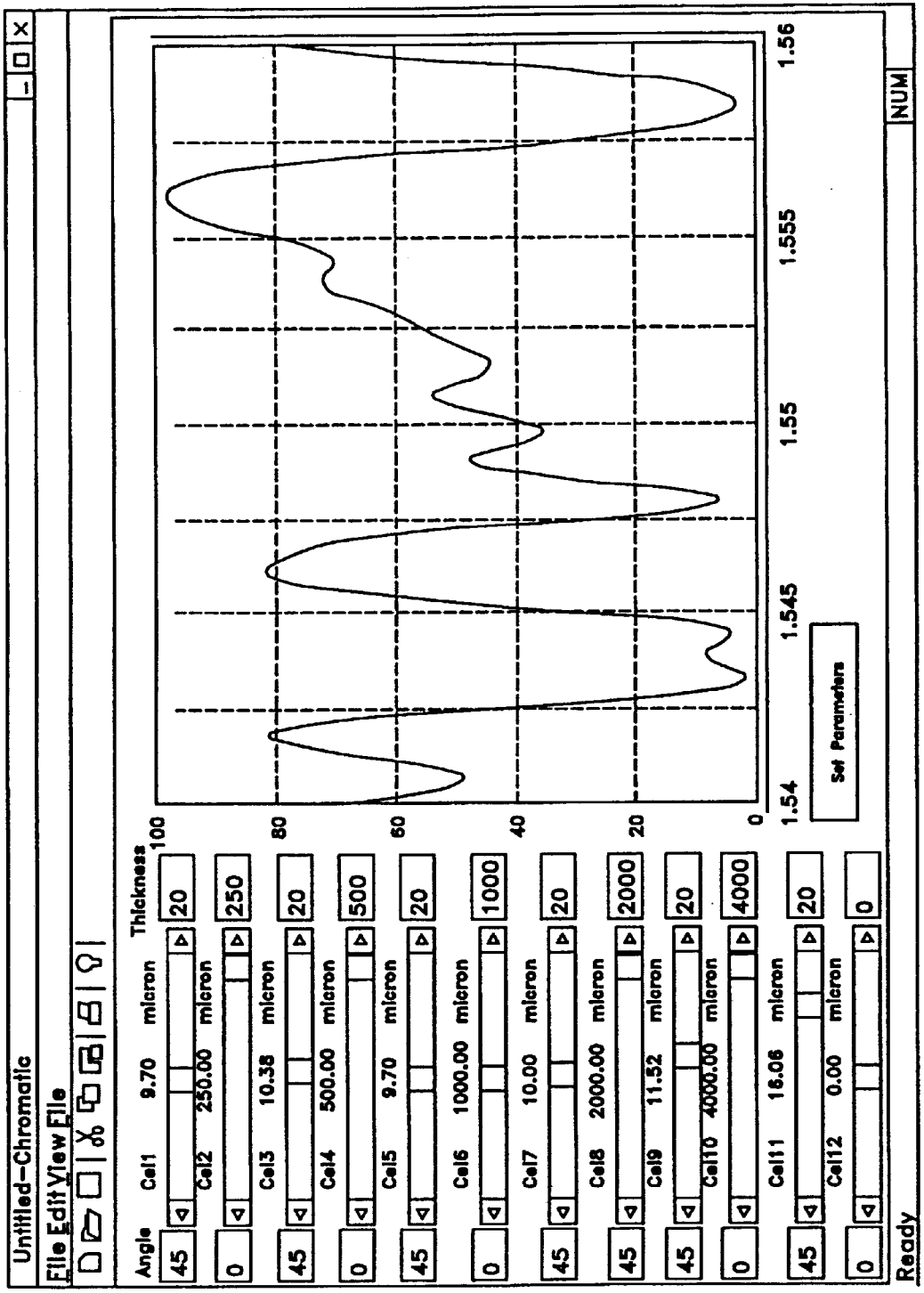
FIG. 5 is an illustration of a simulated monitoring system for a polarization encoder.

In one embodiment including encoder monitoring software may be constructed using a graphical interface, for example, to provide a real time graph of transmission intensity as a function of wavelength. An interface screen in accordance with this embodiment is shown in FIG. 5. For the simulation shown the power level at the input stage is assumed to be uniformly constant over the wavelength range being displayed. The output power level is shown in the graphical window for the settings shown on the left. The display values on the far left give the orientation of the birefringent element, in degrees, with respect to the plane polarized light, while the display value on the far right of the bars represent the maximum value of the thickness of a particular element. Modifying the software can easily extend the numbers of maximum channels.

In general, a polarization encoder as described herein may be used in combination with other devices such as an optical amplifier. The gain of an optical amplifier is generally non-uniform and the power level of the signal entering the amplifier may also be unequal. However to achieve uniform gain for all signals, the power level of the signal entering the amplifier may have to be adjusted to an appropriate value for each wavelength band using a device such as a power level controller. In such a case, the objective may be equal power at the output for all wavelengths, and the input power may be different at each wavelength, which can be achieved by adjusting the control parameters shown on the left in FIG. 5. To set the appropriate controls it is beneficial know the input or output power level as a function of wavelength.

It may also be useful to make automatic adjustments in power level when a polarization encoder is used as part of an optical power level controller. In order to make an automatic gain adjustment device in which the wavelengths are appropriately attenuated to the desired values, it is necessary to identify the power level at the output of the device so that the appropriate correction can be made by feedback control. Thus the invention may further comprise a device which could be used to measure the output power level as function of wavelength.

While several methods exist in the prior art to make these measurements, such as a spectrometer, a more compact version of the device would be more desirable. A non-limiting example of an output power level measuring device is based on a piezoelectric tunable Fabry-Perot interferometer. In such a device, the gap of the resonator is rapidly scanned, while monitoring an output of the cavity as a function of time. The resultant time-dependent signal can then be translated to intensity versus wavelength information. It is also possible to make a MEMS based tunable optical analyzer in which the mirrors are moved using a micro electric machine based system. A MEMS based analyzer comprises mirror coated surfaces which are moved by piezoelectric actuators. The separation between the mirrors determines resonance conditions, while an appropriately placed electrode, which may be a transparent electrode such as indium tin oxide, on the opposite side provides a means of measuring the capacitance, and hence an electrical measurement of the resonance wavelength. The foregoing examples are not exhaustive and other devices for the purpose of measuring output power levels will be apparent.

An encoder according to an embodiment of the present invention may be used as a wavelength dependent optical attenuator for power level adjustments for applications where unequal power levels of different wavelengths have to be minimized prior to optical amplification. Using a device that can detect the power level at different wavelengths, such as the one described above, it is possible to determine the target values of the optical attenuation for different wavelengths, by taking into account, if necessary, the unequal gain profile of the optical amplifier.

For such a case, the optical power level controller will benefit from an ability to attenuate of different wavelengths by different amounts. In some cases it will not be practical to provide an encoder with a one-to-one correspondence between the number of variable parameters and the number of wavelength bands to be controlled. Therefore a statistical minimization procedure may be used to adjust the desired level of attenuation at all wavelengths simultaneously. The inventors have determined such a procedure which allows the desired wavelength dependent attenuation to be achieved close to the target profile. This procedure has been implemented in software, allowing the evaluation of many different configurations to confirm that the target values can be achieved to within a specified range. Using this procedure it has been determined that:

The specified target range may be achieved in a configuration where variable and fixed elements within the polarization encoding stack are singly alternated, and all system parameters are held fixed except for the birefringence of the variable elements. Fixed and variable elements are oriented so that for all elements of one type (fixed or variable) are oriented parallel and the optical axis for all elements of one type makes a 45 degree angle with respect to the optical axis of all elements of the other type.

Better optimization can be achieved in a modified configuration in which some of the variable elements are held in an orientation parallel to that of the fixed elements, while all other variable elements are oriented with the optical axis at a 45 degree angle with respect to the optical axis of fixed elements.

The specified target range may be achieved, using the configuration described above, holding all system parameters fixed except the crystallographic orientation of the variable elements in the encoding stack.

An empirically determined optimum thickness for the fixed elements in the polarization encoding stack has been found to be $xy^n$, where y is the $y^{th}$ fixed element and x is the thickness of the first fixed element.

The invention further comprises a control algorithm to monitor individual channel power levels and provide feedback for proper automatic attenuation of each channel. In one embodiment the output power level of each of the channels is measured and compared to the target value, and the difference computed and feedback to the appropriate channel of the optical power level controller.

In yet another embodiment of the invention, an algorithm that updates all the channels simultaneously is used, which may provide faster response times. Assuming that the power level of different channels are known or determined, it is then possible to compute the attenuation function which would make all channel power levels the same. Allowing the targeted power level to be less than that of the weakest channel may allow greater flexibility in optimization. After setting the target value in the minimization algorithm allows the correct values of birefringence and/or crystallographic orientation to be computed for each of the variable elements of the power level attenuator. The desired optical properties may be related to values of applied voltage for each variable element. Once the appropriate voltages are determined, application of the computed voltages automatically results in power level equalization. This procedure may be periodically updated at the desired rate provided that it is slower than the computation and the update time required for each cycle. An assumption that has been made in this procedure is that the relationship between the birefringence and voltage is known, and that the values of the fixed birefringent elements are also known. In most cases, this is a safe assumption since the relationship between the voltage and the birefringence can be determined if it is not known and the values of the fixed elements can be determined by any suitable calibration procedure.

The polarization encoder 16 may also so be employed as part of a wavelength selectable optical switch. If the encoding stack is configured to rotate the polarization of selected wavelength channels by 90 degrees, while leaving the polarization state of all remaining channels unaltered, the two sets of wavelength channels may be physically separated by passing both signal sets through a polarization beam splitter configured to divert a given polarization.

In an optical transmission system, the polarization encoder may be placed in optical communication with an input optical waveguide and an output optical waveguide. A transmitter, in communication with the input waveguide transmits a signal which travels through the waveguide to the encoder. The encoder processes the signal and passes it to the output waveguide. A receiver receives the processed signal.

Since numerous modifications and changes to the embodiments described above will readily occur to those of ordinary skill in the art, it is not desired to limit the invention to the exact construction and operation illustrated and described. Accordingly, all suitable modifications and equivalents should be considered as falling within the spirit and scope of the invention.

What is claimed is:

1. A polarization encoder, comprising:
   a first optical component configured and arranged to accept an input beam of light having a plurality of channels included therein and to divide the input beam of light into a first intermediate beam and a second intermediate beam, the first and second intermediate beams having respectively orthogonal polarizations;
   a second optical component configured and arranged to selectably and controllably impart a respective wavelength dependent polarization to each of selected ones of the channels in each of the intermediate beams; and
   a third optical component configured and arranged to combine the first and second intermediate beams into an output beam having the plurality of channels therein, each of the selected ones of the channels having a respective wavelength dependent polarization.

2. A polarization encoder as in claim 1, wherein at least one of the first and the third optical components is a polarization diversity component.

3. A polarization encoder as in claim 1, wherein the second optical component further comprises a plurality of variable birefringent elements.

4. A polarization encoder as in claim 3, wherein each one of the plurality of variable birefringent elements are identical.

5. A polarization encoder as in claim 3, wherein at least two of the plurality of variable birefringent elements are non-identical.

6. A polarization encoder as in claim 3, wherein the variable birefringent elements are electronically controllable.

7. A polarization encoder as in claim 3, wherein the variable birefringent elements are controllable one of mechanically, thermally, electromagnetically and by optical field.

8. A polarization encoder as in claim 3, wherein the second optical component further comprises a plurality of fixed birefringent elements.

9. A polarization encoder as in claim 3, wherein the second optical component further comprises a plurality of birefringent elements selected from the group consisting of: liquid crystal elements, polymer elements, oriented polymer elements, calcite crystal elements, polarization maintaining fiber, lithium niobate elements and combinations thereof.

10. A polarization encoder as in claim 8, wherein the second optical component further comprises a plurality of birefringent elements selected from the group consisting of: liquid crystal elements, polymer elements, oriented polymer elements, calcite crystal elements, polarization maintaining fiber, lithium niobate elements and combinations thereof.

11. A polarization encoder as in claim 1, wherein the polarization encoder comprises a portion of a waveguiding optical path.

12. A polarization encoder comprising: an optical component configured and arranged to accept an input beam of light having a plurality of channels therein;
means selectably to impart a respective wavelength dependent polarization to selected ones of the channels; and,
means to control at least one of selection of said channels and an extent of said polarization.

13. A polarization encoder as in claim 12, wherein the optical component further comprises a plurality of birefringent elements.

14. A polarization encoder as in claim 12, wherein the optical component is further configured and arranged to arbitrarily and continuously impart the respective wavelength dependent polarization to each of the selected ones of the channels.

15. A polarization encoder as in claim 12, wherein said means to control comprises a control circuit coupled to the optical component.

16. A polarization encoder as in claim 15, wherein the control circuit controls the controllable variable birefringent elements one of mechanically, electrically, optically and magnetically.

17. A method of polarization encoding of an input beam of light having a plurality of channels included therein, comprising, in order:
receiving an input beam of light;
selectably and controllably imparting a polarization to selected ones of the channels; and
transmitting an output beam of light containing the selected ones of the channels.

18. A method of polarization encoding of an input beam of light having a plurality of channels included therein, comprising, in order:
receiving an input beam of light;
selectably and controllably imparting a polarization to selected ones of the channels;
transmitting an output beam of light containing the selected ones of the channels; and,
further comprising controlling said polarization by feedback control to statistically minimize deviations between desired and actual values for each channel simultaneously.

19. A method of polarization encoding of an input beam of light having a plurality of channels included therein, comprising, in order:
receiving an input beam of light;
selectably and controllably imparting a polarization to selected ones of the channels;
transmitting an output beam of light containing the selected ones of the channels; and,
wherein controllably imparting a polarization to selected ones of the channels further comprises: splitting the input beam of light into a first intermediate beam and a second intermediate beam; imparting a polarization to the selected ones of the channels in the intermediate beams with a plurality of variable birefringent elements; and combining the intermediate beams into an output beam.

20. An optical transmission system comprising: an input optical waveguide configured to accept an input optical signal having a plurality of wavelength division multiplexed channels therein; a polarization encoder in optical communication with the optical waveguide, the optical waveguide being configured to divide the input beam of light into a first intermediate beam and a second intermediate beam, the first and second intermediate beams having respectively perpendicular polarizations; a polarization encoding element, configured and arranged to selectably and controllably impart a respective polarization to each of selected ones of the channels in each of the intermediate beams such that the selected ones of the channels may be respectively manipulated by polarization dependent optical elements, said polarization encoding element comprising a plurality of variable birefringent elements including sufficient variable birefringent elements to respectively control a polarization of each channel.

21. An optical transmission system as recited in claim 20, further comprising:
an optical element configured and arranged to accept the first and second intermediate beams and to combine the first and second intermediate beams into an output beam of light; and
an output optical waveguide configured to accept the output beam of light from the polarization encoder.

22. An optical transmission system as in claim 20, further comprising:
a transmitter in optical communication with the input optical waveguide configured and arranged to produce the input optical signal; and
a receiver in optical communication with the output optical waveguide configured and arranged to receive the output optical signal.

23. An optical system comprising:
a first polarization encoder comprising an optical component configured and arranged to accept an input beam of light having a plurality of channels therein and to selectably and controllably impart a respective wavelength dependent polarization to each of selected ones of the channels;
at least a second polarization encoder comprising an optical component configured and arranged to accept from an output beam of the first polarization encoder an input beam of light having a plurality of channels therein and to selectably and controllably impart a respective wavelength dependent polarization to each of selected ones of the channels.

24. An optical system in claim 23, wherein the optical component further comprises a plurality of birefringent elements.

25. An optical system in claim 23, further comprising at least one additional polarization encoder, and at least one additional optical device, each optical device being disposed between a respective pair of polarization encoders.

* * * * *